US007695364B2

(12) United States Patent
Okada

(10) Patent No.: US 7,695,364 B2
(45) **Date of Patent: *Apr. 13, 2010**

(54) GAMING MACHINE

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1035 days.

This patent is subject to a terminal disclaimer.

(21) Appl. No.: 10/697,082

(22) Filed: Oct. 31, 2003

(65) Prior Publication Data

US 2004/0209678 A1 Oct. 21, 2004

(30) Foreign Application Priority Data

Nov. 20, 2002 (JP) ........................... P2002-336274

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................. 463/20; 463/16; 463/30; 349/58; 273/138.1; 273/277

(58) Field of Classification Search ................. 361/681; 463/20, 30, 13, 16; 273/162
See application file for complete search history.

(56) References Cited

U.S. PATENT DOCUMENTS

| | | | |
|---|---|---|---|
| 4,371,870 A | 2/1983 | Biferno | |
| 4,518,225 A | 5/1985 | Fredrickson et al. | |
| 4,562,433 A | 12/1985 | Biferno et al. | |
| 4,568,928 A | 2/1986 | Biferno | |
| 4,718,672 A * | 1/1988 | Okada | 463/20 |
| 4,826,296 A | 5/1989 | Yoshimura | |
| 4,998,804 A | 3/1991 | Horiuchi | |
| 5,146,354 A | 9/1992 | Plesinger | |

(Continued)

FOREIGN PATENT DOCUMENTS

EP 1 260 928 A2 11/2002

(Continued)

OTHER PUBLICATIONS

European Search Report Dated Sep. 16, 2004.

(Continued)

*Primary Examiner*—John M. Hotaling, II
*Assistant Examiner*—Paul A. D'Agostino
(74) *Attorney, Agent, or Firm*—Rader, Fishman & Grauer, PLLC

(57) ABSTRACT

During a slot machine game, game effects are also displayed on a liquid crystal panel 39*d* provided in a reel display window unit 39, and thus the liquid crystal panel 39*d* serves as a new machine component for performing game effects. Therefore, new effects for the game can be performed on the liquid crystal panel 39*d*, which facilitates maintaining the novelty of game effects. Furthermore, a reel glass base 39*b* and a bezel metal frame 39*c* are interposed between a transparent acryl plate 39*a* and the liquid crystal panel 39*d*. As a result, the display unit of the liquid crystal panel 39*d* is disposed in a position recessed from the transparent acryl plate 39*a*. Therefore, the display unit of the liquid crystal panel 39*d* is provided with depth feeling, and can be clearly viewed up to the edge of the display unit.

4 Claims, 10 Drawing Sheets

U.S. PATENT DOCUMENTS

| | | | | | |
|---|---|---|---|---|---|
| 5,372,745 | A | * | 12/1994 | Yoshinaga et al. | 252/299.01 |
| 5,546,296 | A | | 8/1996 | Savignac et al. | |
| 5,636,101 | A | * | 6/1997 | Bonsall et al. | 361/681 |
| 5,920,256 | A | | 7/1999 | Toffolo et al. | |
| 6,135,884 | A | * | 10/2000 | Hedrick et al. | 463/20 |
| 6,141,067 | A | | 10/2000 | Ikka | |
| 6,164,645 | A | | 12/2000 | Weiss | |
| 6,181,301 | B1 | | 1/2001 | Inoguchi et al. | |
| 6,219,228 | B1 | * | 4/2001 | Sun | 361/683 |
| 6,315,663 | B1 | | 11/2001 | Sakamoto | |
| 6,339,418 | B1 | | 1/2002 | Kitagawa | |
| 6,377,339 | B1 | | 4/2002 | Westerman et al. | |
| 6,517,433 | B2 | * | 2/2003 | Loose et al. | 463/20 |
| 6,600,527 | B1 | | 7/2003 | Basturk et al. | |
| 6,623,006 | B2 | | 9/2003 | Weiss | |
| 6,638,165 | B2 | | 10/2003 | Uchiyama et al. | |
| 6,642,975 | B2 | | 11/2003 | Chino et al. | |
| 6,720,021 | B2 | | 4/2004 | Wong et al. | |
| 6,734,927 | B2 | * | 5/2004 | Sato | 349/58 |
| 6,802,575 | B1 | * | 10/2004 | Lee | 312/7.2 |
| 6,817,946 | B2 | * | 11/2004 | Motegi et al. | 463/31 |
| 6,820,875 | B1 | * | 11/2004 | Hedrick et al. | 273/138.1 |
| 6,853,410 | B2 | | 2/2005 | Matsuda et al. | |
| 6,893,345 | B2 | | 5/2005 | Motegi et al. | |
| 6,954,238 | B2 | | 10/2005 | Liu et al. | |
| 6,976,915 | B2 | | 12/2005 | Baker et al. | |
| 2001/0031658 | A1 | * | 10/2001 | Ozaki et al. | 463/16 |
| 2001/0050736 | A1 | | 12/2001 | Lee et al. | |
| 2002/0018153 | A1 | | 2/2002 | Kitabayashi | |
| 2002/0063816 | A1 | | 5/2002 | Nakamura et al. | |
| 2003/0016313 | A1 | * | 1/2003 | Jeong | 349/58 |
| 2003/0060269 | A1 | * | 3/2003 | Paulsen et al. | 463/20 |
| 2003/0087690 | A1 | | 5/2003 | Loose et al. | |
| 2003/0184690 | A1 | | 10/2003 | Ogiwara et al. | |
| 2003/0214471 | A1 | | 11/2003 | Topelberg | |
| 2004/0029636 | A1 | | 2/2004 | Wells | |
| 2005/0192090 | A1 | * | 9/2005 | Muir et al. | 463/30 |

FOREIGN PATENT DOCUMENTS

| | | | |
|---|---|---|---|
| EP | 1 376 494 | A2 | 1/2004 |
| EP | 1 571 622 | A1 | 9/2005 |
| JP | 05-134240 | A | 5/1993 |
| JP | 06-142278 | A | 5/1994 |
| JP | 6212102 | | 8/1994 |
| JP | 07-124290 | A | 6/1995 |
| JP | 10-244054 | A | 9/1998 |
| JP | 2000-300729 | A | 10/2000 |
| JP | 2000-308726 | A | 11/2000 |
| JP | 2001-005406 | A | 1/2001 |
| JP | 2001-062032 | A | 3/2001 |
| JP | 2001-252394 | A | 9/2001 |
| JP | 2001-305971 | A | 11/2001 |
| JP | 2002-113150 | A | 4/2002 |
| WO | WO 98/03962 | | 1/1998 |
| WO | WO-03/039699 | A1 | 5/2003 |

OTHER PUBLICATIONS

Japanese Office Action dated Aug. 17, 2004.
Japanese Office Action dated Dec. 7, 2004.
European Search Report (App. No. 06003130.9) (5 pages).
Office Action for Chinese Application No. 2004100294660.0, dated Feb. 29, 2008.
Australian Office Action, App. No. 2004200887, Jan. 21, 2009 (7 pages).

* cited by examiner (a)

(b)

(a)

(b)

GAMING MACHINE

FIELD OF TECHNOLOGY

This invention relates to a gaming machine comprising a transparent electric display panel disposed in front of variable display means for variably displaying designs.

DESCRIPTION OF RELATED ART

Conventionally, this type of gaming machine includes, for example, a slot machine. The slot machine comprises three reels embedded behind its front panel. Each reel comprises a reel band affixed on the outer periphery of its reel drum, and various designs are drawn on the outer periphery of the reel band. These designs may be viewed by a player through three windows formed in the front panel.

A slot machine game is started when the player's operation of a start lever causes each reel to rotate and a moving sequence of designs is variably displayed in each window. Subsequently, the player's operation of a stop button causes each reel to stop rotating, and designs corresponding to the operation timing of the stop button are stop-displayed in each window. At this time, if any predetermined combination of designs is stop-displayed in the windows, a winning occurs.

During the game, the slot machine game provides effects such as blinking lamps embedded in each reel or displaying character designs on a liquid crystal display device provided below the windows of the front panel.

SUMMARY OF THE INVENTION

In conventional gaming machines described above, the novelty of game effects is maintained by changing the blinking pattern of the lamps embedded in the reels, changing effect contents given by character designs displayed on the liquid crystal display device, or otherwise. However, in the conventional gaming machines described above, the machine components of the gaming machine for effecting game effects have been well-established. Accordingly, there are some difficulties in maintaining the novelty of game effects.

To solve these problems, this invention provides a gaming machine comprising: variable display means for variably displaying designs; a transparent liquid crystal display panel disposed in front of the variable display means through which the variable display means is able to be seen; a liquid crystal holder for holding the periphery of the display unit of the liquid crystal display panel on a rear side thereof; a panel frame for holding the periphery of a display unit of the liquid crystal display panel on a front side thereof; a light guiding plate for guiding light emitted from a light source to the rear side of the liquid crystal display panel; diffusion means for diffusing the light guided by the light guiding plate to equalize the light which illuminates the liquid crystal display panel; a base frame attached in front of the machine for supporting the liquid crystal holder, panel frame, light guiding plate and diffusion means such that the front of the display unit of the liquid crystal display panel has an opening; a transparent plate disposed in front of the base frame for closing the opening; and a rear holder for holding the liquid crystal holder, panel frame, light guiding plate and diffusion means supported by the base frame on the base frame from behind, and for reflecting the light emitted on the light guiding plate to the side of the liquid crystal display panel, the rear holder having one or more windows allowing the designs variably displayed in the variable display means to be observed.

According to this configuration, the liquid crystal display panel disposed in front of the variable display means for variably displaying designs serves as a new machine component for performing game effects. Further, a base frame and a panel frame are interposed between the transparent plate on the machine surface and the liquid crystal display panel. As a result, the display unit of the liquid crystal display panel for displaying game effects is disposed in a position recessed from the transparent plate.

DETAILED DESCRIPTION OF THE INVENTION

An embodiment will now be described in which a gaming machine in accordance with this invention is applied to a slot machine.

Figure 1:
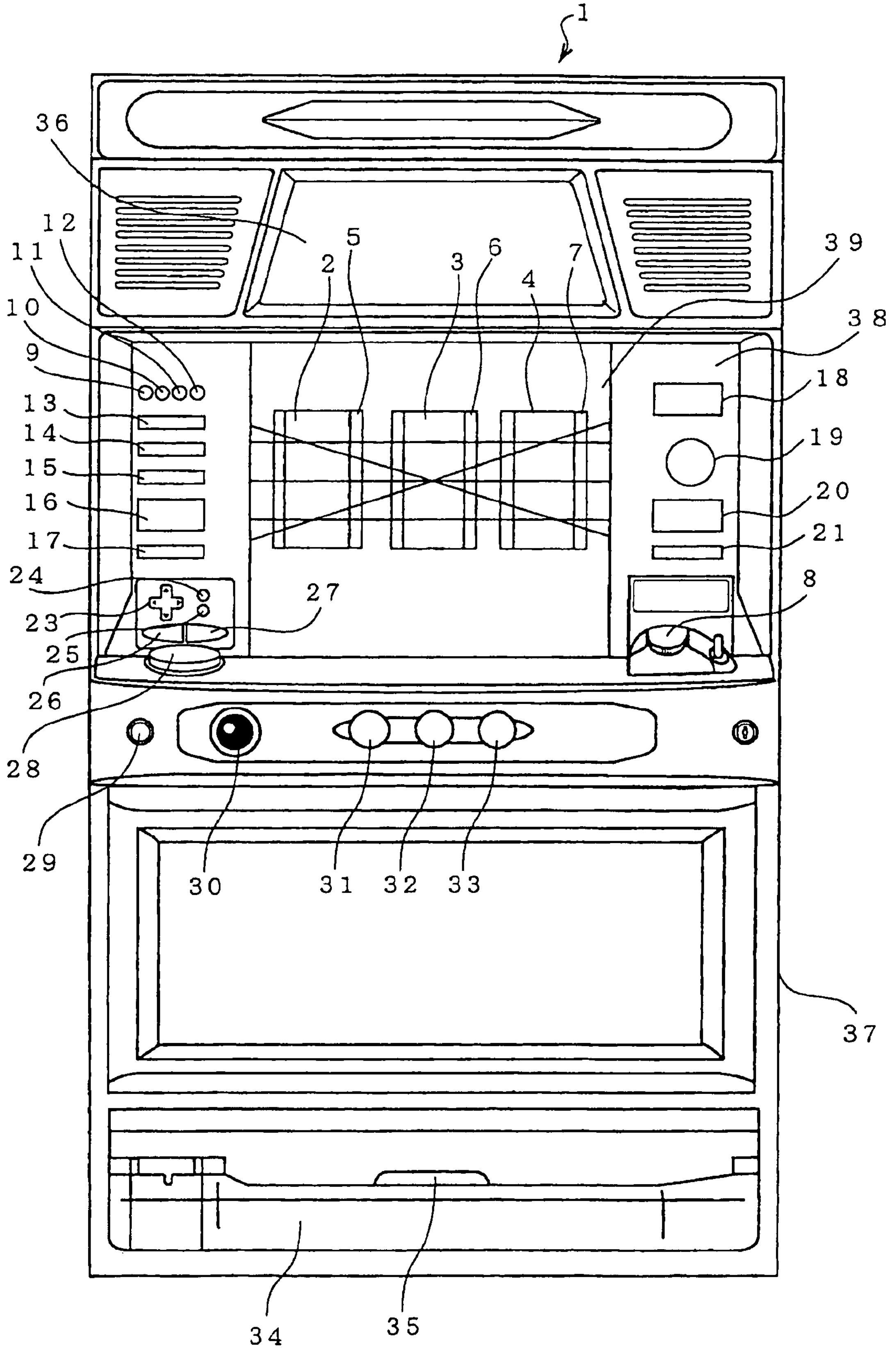
FIG. 1 is a front view showing an appearance of a slot machine in accordance with an embodiment of this invention.

FIG. 1 is a front view showing an appearance of a slot machine 1 in accordance with this embodiment.

Inside a cabinet at the center of the main body of the slot machine 1, three reels 2, 3, and 4 are rotatably provided. These reels 2, 3, and 4 constitute variable display means for variably displaying various designs used for a game in a plurality of rows. On the outer periphery of each reel 2, 3, 4, a plurality of kinds of designs (hereinafter referred to as symbols) are drawn to form a symbol sequence. A reel display window unit 39 is provided in front of these reels 2-4. Through display windows 5, 6, and 7 formed in the reel display window unit 39, symbols drawn on the reels 2, 3, and 4 are observed, three symbols for each reel. A total of five pay lines are provided on the reel display window unit 39 where three of them are horizontal and two diagonal. Furthermore, below the display windows 5-7, on the right side, an insertion slot 8 is provided through which a player can insert one or more medals serving as gaming media.

Figure 2:
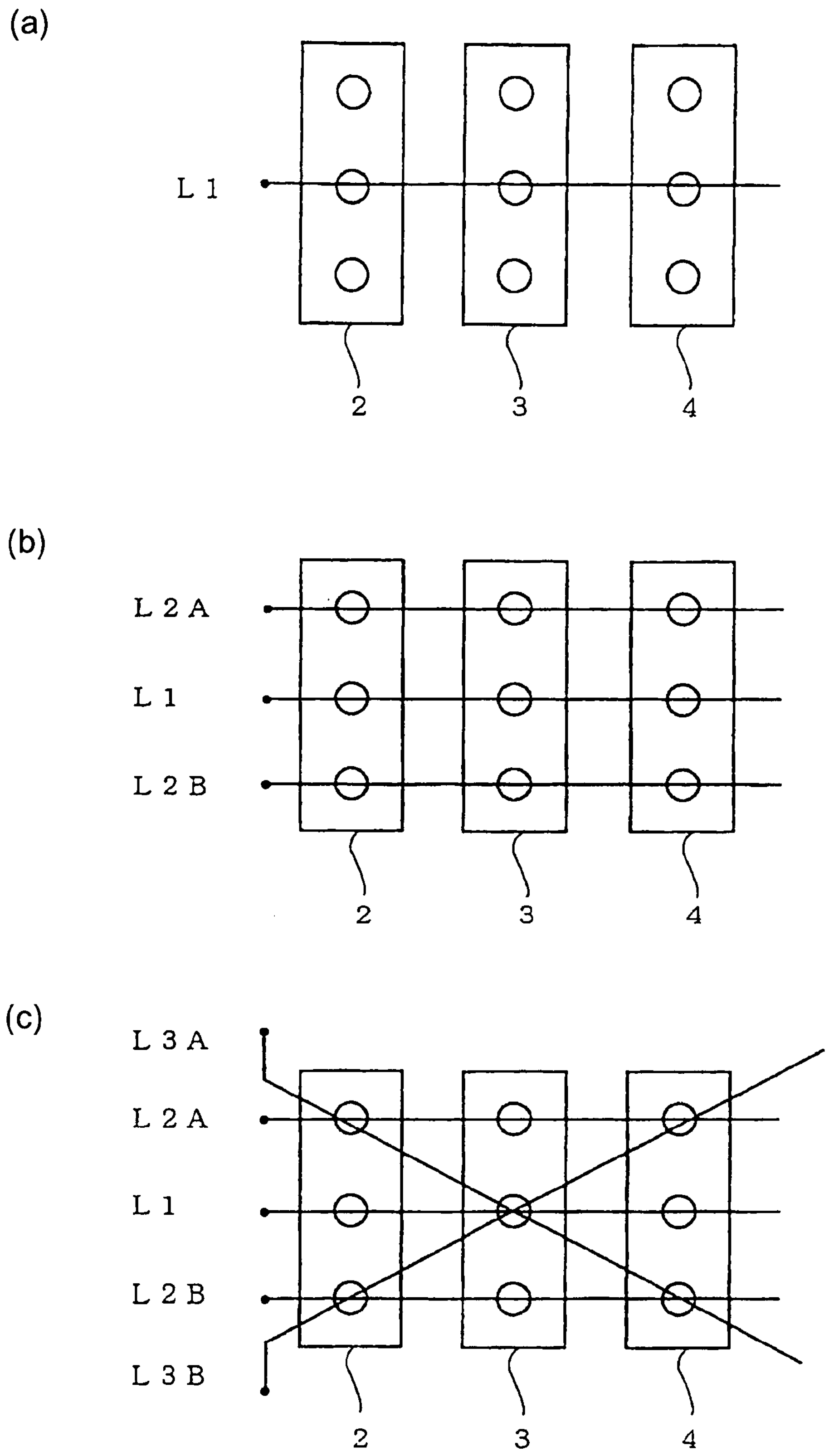
FIG. 2 shows how the pay lines depicted on the display windows of the slot machine in accordance with this embodiment are sequentially activated.

When a player inserts one medal into the medal insertion slot 8 prior to starting a game, one horizontal center pay line L1 is activated as shown in FIG. 2(*a*). When two medals are inserted, two upper and lower horizontal pay lines L2A and L2B are added thereto, and thus three horizontal pay lines L1, L2A, and L2B are activated as shown in FIG. 2(*b*). Furthermore, when three medals are inserted, all the five pay lines L1, L2A, L2B, L3A, and L3B are activated as shown in FIG. 2(*c*). A circle sign shown in FIG. 2 represents a symbol drawn on each reel 2-4.

On a machine front panel 38 to the left of the display windows 5-7, from the top, there are four chance LEDs (light emitting diodes) 9-12, three game operation indicator lamps 13-15, a deposited number of game medals display unit 16, and a start lamp 17 provided. The chance LEDs 9-12 and the game operation indicator lamps 13-15 are controllably lighted up in accordance with the game status to inform a player of the current game status. The deposited number of game medals display unit 16 is composed of three digits of seven-segment LEDs and displays the number of medals currently credited within the machine. The start lamp 17 is blinked when each reel 2-4 can be actuated.

On the machine front panel 38 to the right of the display windows 5-7, from the top, there are a bonus count display unit 18, a WIN lamp 19, number of payout medals display unit 20, and an insert lamp 21 provided. The bonus count display unit 18 is composed of three digits of seven-segment LEDs and digitally displays, when a player wins a bonus game, the remaining number of times the player could win the RB game and JAC game described below. The WIN lamp 19 is lighted up when a winning combination of symbols lines up on any activated pay line. The number of payout medals display unit 20 is composed of three digits of seven-segment LEDs and displays the number of medals paid out due to the winning. The insert lamp 21 is lighted up when the insertion slot 8 can accept the insertion of medals.

The reel display window unit 39 comprises a liquid crystal panel 39*d* (described below) stacked thereon as an electric display panel. The liquid crystal panel 39*d* may display various game information and game effect image. Below the left-hand machine front panel 38, there are a cross key 23, an A-button 24, a B-button 25, one-deposited-medal insertion switch 26, two-deposited-medal insertion switch 27, and three-deposited-medal insertion switch 28 provided. The cross key 23 is switched in four directions of up, down, left, and right, and is operated in conjunction with the A-button 24 and B-button 25 for use in selecting information to be displayed on the liquid crystal panel 39*d*. The deposited-medal insertion switches 26-28 are used in betting one to three medals on one game instead of inserting medals into the medal insertion slot 8 when the deposited number of game medals display unit 16 is displaying the number of credited medals.

Below the reel display window unit 39, from the left, there are a deposited-medal adjusting switch 29, a start lever 30, and stop buttons 31, 32, and 33 provided. The start lever 30 constitutes game starting means for starting a game. The deposited-medal adjusting switch 29 is used in adjusting the medals credited within the machine. Operation of the start lever 30 causes each reel 2-4 to start rotating simultaneously. The stop buttons 31-33, disposed corresponding to the reels 2-4, respectively, are activated for operation when the rotating of each reel 2-4 reaches a predetermined speed, and stop the rotating of respective reels 2-4 in response to the player's operation. The stop buttons 31-33 constitute variable display stopping means for stopping the rotating display of the reels 2-4.

A medal receiving tray 34 is provided at the front bottom of the slot machine 1. The medal receiving tray 34 serves to store medals paid out of a medal payout opening 35. At the front top of the slot machine 1, a payout display unit 36 is provided for displaying how many medals will be paid out for winning.

Figure 3:
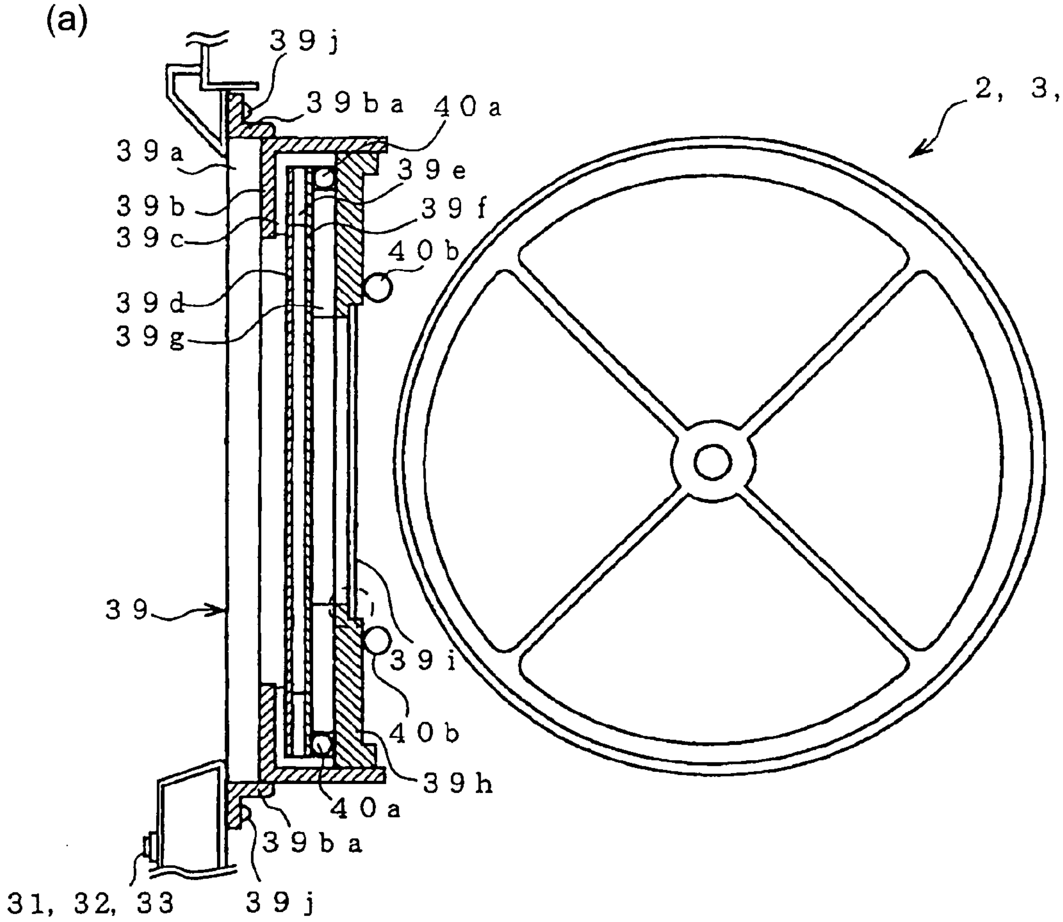
FIG. 3 is a vertical cross-sectional view of the reel display window unit of the slot machine in accordance with this embodiment.
Figure 3:
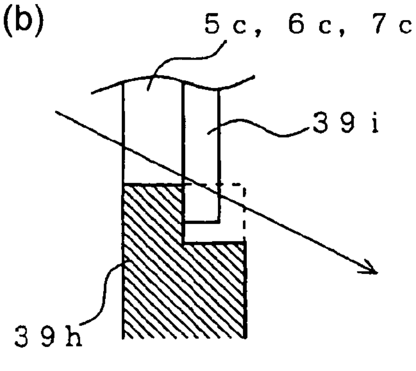
Figure 4:
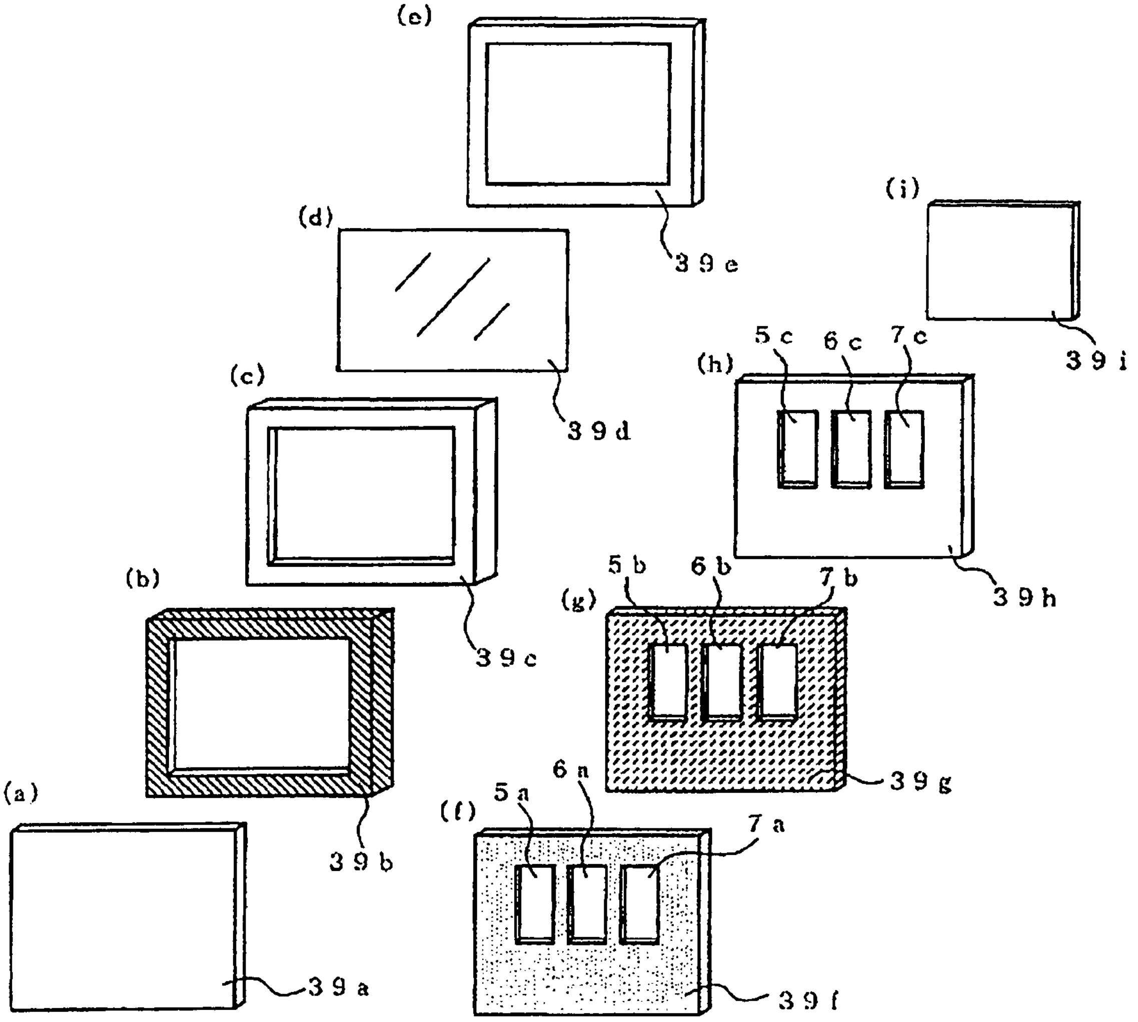
FIG. 4 is an exploded perspective view of the reel display window unit shown in FIG. 3.

FIG. 3(*a*) is a vertical cross-sectional view of the slot machine 1 at the reel display window unit 39, and FIG. 4 is an exploded perspective view of the reel display window unit 39. The reel display window unit 39 constitutes front display means, and is provided in front of the reels 2, 3, and 4 as shown in FIG. 3(*a*). As shown in FIGS. 4(*a*)-(*i*), the reel display window unit 39 comprises, disposed from the front side of the machine, a transparent acryl plate 39*a*, a reel glass base 39*b*, a bezel metal frame 39*c*, a liquid crystal panel 39*d*, a liquid crystal holder 39*e*, a diffusion sheet 39*f*, a light guiding plate 39*g*, a rear holder 39*h*, and an antistatic sheet 39*i*. The diffusion sheet 39*f*, light guiding plate 39*g*, and rear holder 39*h* are provided with openings 5*a*, 5*b*, and 5*c* forming the display window 5, openings 6*a*, 6*b*, and 6*c* forming the display window 6, and openings 7*a*, 7*b*, and 7*c* forming the display window 7.

The reel display window unit 39 is mounted on the machine front panel 38 such that, as shown in FIG. 3(*a*), brackets 39*ba* provided on the reel glass base 39*b* and protruding upward and downward are screwed on the rear of the machine front panel 38 with screws 39*j*, respectively. Note that in FIG. 4(*b*), each bracket 39*ba* provided on the reel glass base 39*b* is not shown.

At the upper and lower ends of the light guiding plate 39*g*, a pair of cold-cathode tubes 40*a* is provided as a light source for the liquid crystal panel 39*d*. Above and below each window 5*c*, 6*c*, 7*c* of the rear holder 39*h* on its rear side, another pair of cold-cathode tubes 40*b* is provided for illuminating symbols drawn on the outer periphery of each reel 2-4.

The liquid crystal panel 39*d* is a transparent electric display panel disposed in front of the reels 2-4 and made of ITO or the like through which each reel 2-4 can be seen. The rear side of the periphery of its display unit is held by the liquid crystal holder 39*e*. The light guiding plate 39*g* is made of a light transparent resin panel, and has a lens cut formed therein for guiding light emitted from the laterally disposed cold-cathode tubes 40*a* to the rear side of the liquid crystal display panel 39*d*. The diffusion sheet 39*f* is made of a light transparent resin sheet, and constitutes diffusion means for equalizing the light which illuminates the liquid crystal display panel 39*d*. The liquid crystal holder 39*e* holding the liquid crystal display panel 39*d*, the diffusion sheet 39*f*, and the light guiding plate 39*g* are integrated and the periphery thereof is inserted into the bezel metal frame 39*c*. This insertion allows the front side of the periphery of the display unit of the liquid crystal panel 39*d* to be held by the bezel metal frame 39*c*.

The bezel metal frame 39*c*, into which the liquid crystal holder 39*e*, the diffusion sheet 39*f*, and the light guiding plate 39*g* are fitted and integrated, has its periphery inserted into the reel glass base 39*b*, and is supported by the reel glass base 39*b* such that the front of the display unit of the liquid crystal panel 39*d* has an opening. Since the reel glass base 39*b* is attached to the machine front panel 38 with the screws 39*j*, the transparent acryl plate 39*a* is pressure bonded to the front of the reel glass base 39*b* and occludes the above-described opening of the front of the display unit of the liquid crystal panel 39*d*.

The rear holder 39*h* is made of a white resin plate and holds, on the reel glass base 39*b* from behind, the bezel metal frame 39*c*, the liquid crystal holder 39*e* holding the liquid crystal panel 39*d*, the diffusion sheet 39*f*, and the light guiding plate 39*g*, which are supported by the reel glass base 39*b*. The rear holder 39*h* also functions as a reflection plate for reflecting the light, emitted from the cold-cathode tubes 40*a* on the light guiding plate 39*d*, to the side of the liquid crystal panel 39*d*. The antistatic sheet 39*i*, being transparent, is adhered to the rear side of the rear holder 39*h* with double-sided tapes and covers the rear side of the openings 5c, 6c, and 7c formed in the rear holder 39h.

FIG. 3(b) is a partial enlarged view of a marginal portion of the opening 5c, 6c, 7c of the rear holder 39h, which is circumscribed by a dashed circle shown in FIG. 3(a). A marginal corner portion of the rear side of the opening 5c, 6c, 7c of the rear holder 39h has been chipped away. The antistatic sheet 39i is adhered to this chipped portion.

Figure 5:
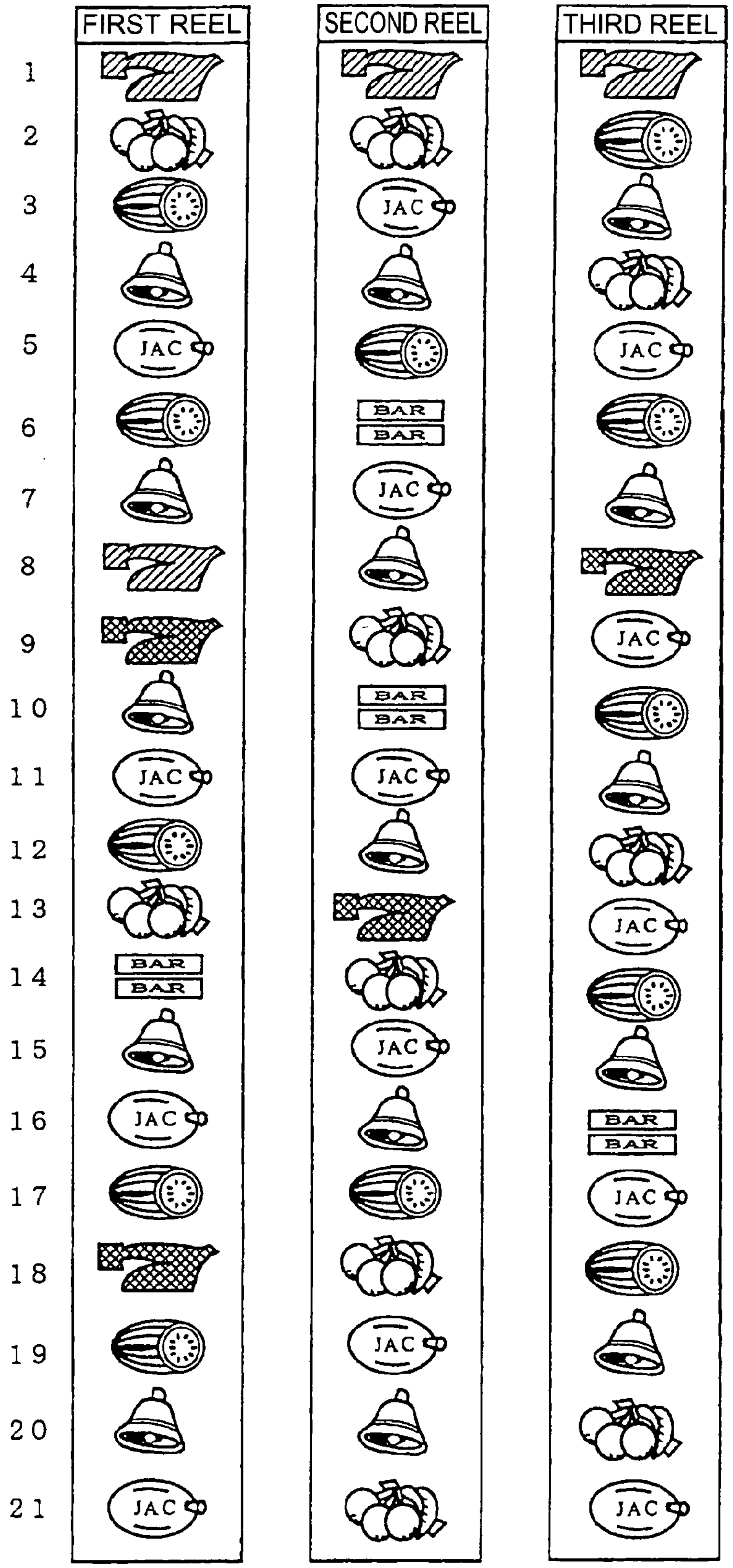
FIG. 5 shows symbols drawn on the outer periphery of the reels of the slot machine in accordance with this embodiment.

FIG. 5 shows symbol sequences drawn on the outer periphery of the reels 2, 3, and 4. Each symbol sequence comprises 21 arranged symbols of a plurality of kinds. The symbol sequences correspond to a first reel 2, a second reel 3, and a third reel 4, respectively, from the left in the figure. Each symbol is assigned a code number among "1" to "21". Each reel 2, 3, 4 is rotationally driven such that its symbol sequence moves downward in the figure.

There are seven kinds of symbols: "Red 7" representing a digit shaded with mesh lines; "Blue 7" representing a digit shaded with lines sloping down to the left; "BAR" including two lines of alphabetic letters BAR arranged vertically; "Watermelon" consisting of a picture of a watermelon; "Bell" consisting of a picture of a bell; "Plum" consisting of a picture of a plum; and "Cherry" consisting of a picture of cherries.

Figure 6:
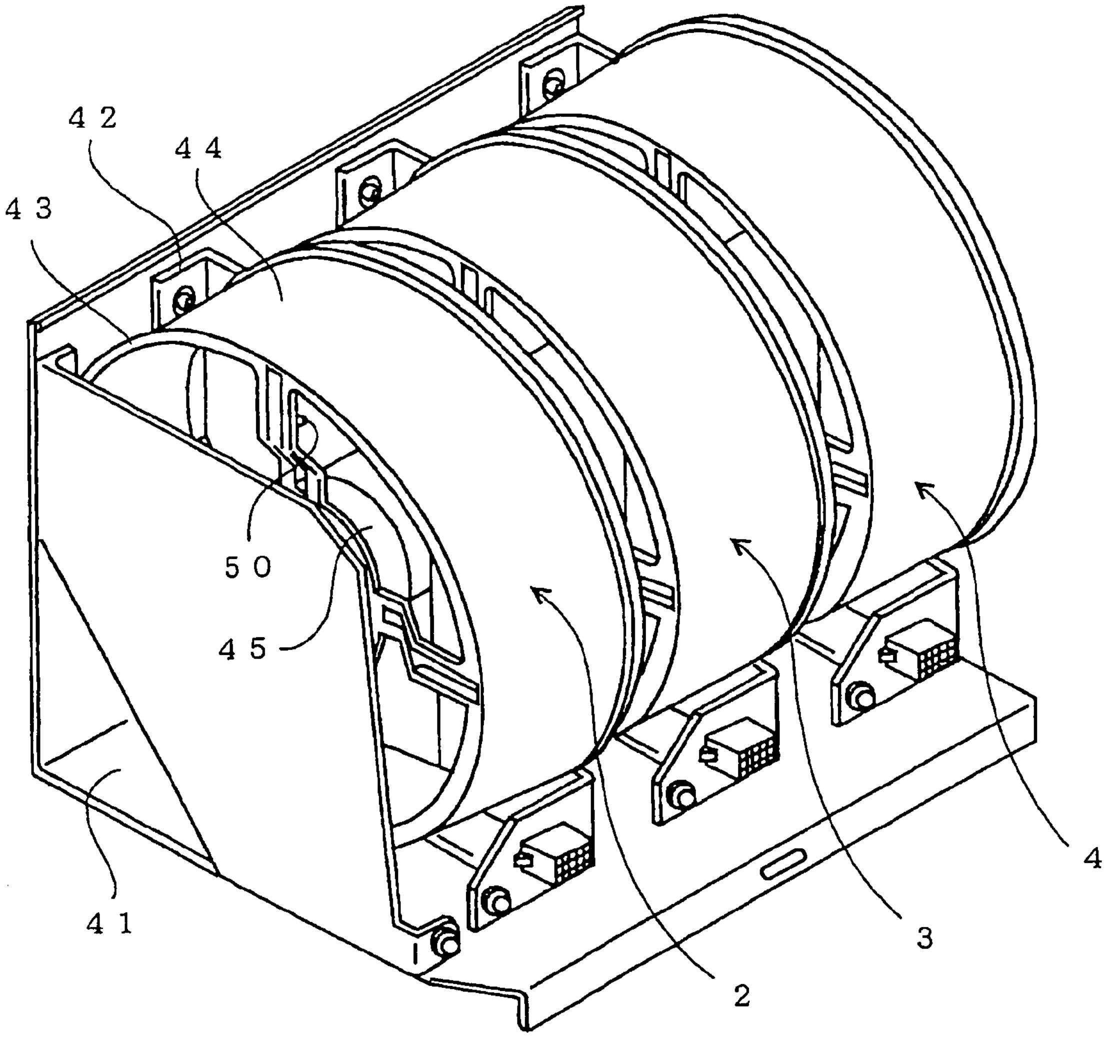
FIG. 6 is a perspective view showing a rotatable reel unit of the slot machine in accordance with this embodiment.

Each reel 2-4 is configured as a rotatable reel unit as shown in FIG. 6, and attached to a frame 41 via a bracket 42. Each reel 2-4 comprises a reel drum 43 having a reel band 44 affixed on its outer periphery. The symbol sequence described above is drawn on the outer periphery of the reel band 44. Each bracket 42 is provided with a stepping motor 45. The reels 2-4 rotate when the stepping motors 45 are driven.

Figure 7:
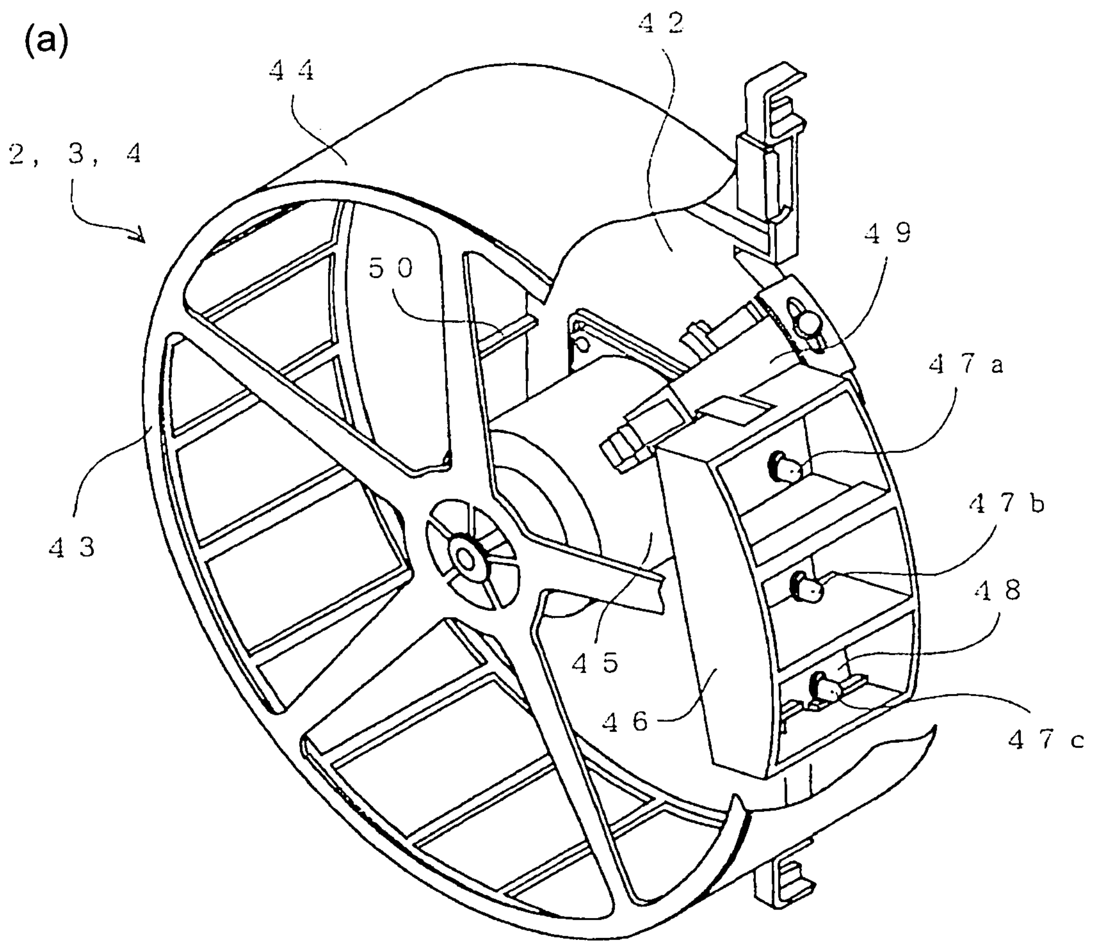
FIGS. 7(*a*) and 7(*b*) are perspective views showing a structure of a rotatable reel constituting the rotatable reel unit shown in FIG. 6.
Figure 7:
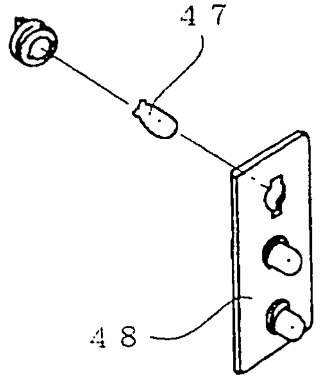

Each reel 2-4 has a structure shown in FIG. 7(a). Note that in this figure, like parts as in FIG. 6 are marked with like reference letters and are not described herein. A lamp case 46 is provided inside the reel drum 43 behind the reel band 44. Back lamps 47a, 47b, and 47c are installed in three compartments of the lamp case 46, respectively. Each of these back lamps 47a-47c is made of a while LED (light emitting diode) having a great amount of light emission, mounted on a board 48 as shown in FIG. 7(b). The board 48 is in turn attached to the rear side of the lamp case 46. Furthermore, a photosensor 49 is attached to the bracket 42. The photosensor 49 detects a shield plate 50 provided on the reel drum 43 passing by the photosensor 49 in association with the rotating of the reel drum 43.

Each back lamp 47a-47c is controllably lighted up by the lamp drive circuit described below. Each of the lighted back lamps 47a-47c separately illuminates three symbols positioned in front of the back lamp 47 among the symbols drawn on the reel band 44, and the three symbols are projected on each display window 5-7. In this embodiment, since the back lamps 47a-47c have a great amount of light emission, they also illuminate the liquid crystal panel 39d in front thereof. Furthermore, since the back lamps 47a-47c are made of white LEDs, the colors of the symbols drawn on the reel band 44 and of the effect displayed on the liquid crystal panel 39d are viewed in a manner faithful to the original colors.

Figure 8:
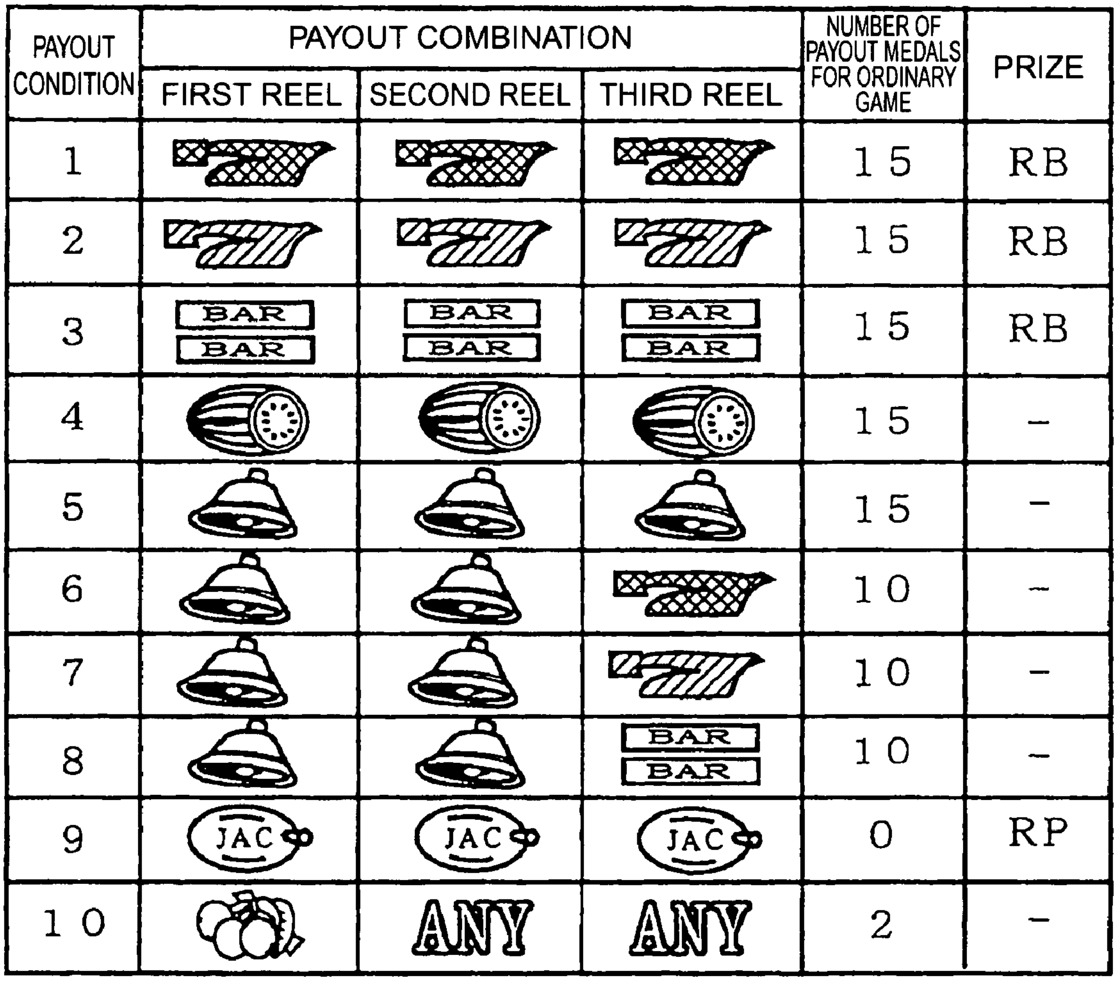
FIG. 8 shows a symbol combination drawn on a payout display unit of the slot machine in accordance with this embodiment.

FIG. 8 shows a winning symbol combination table, which has been predetermined in the slot machine 1 in accordance with this embodiment, and shown on the payout display unit 36 at the front top of the slot machine 1. In a ordinary game, if a combination of symbols "Red 7"-"Red 7"-"Red 7", a combination of symbols "Blue 7"-"Blue 7"-"Blue 7", or a combination of symbols "BAR"-"BAR"-"BAR" lines up on any activated pay line, fifteen medals are paid out and then an RB (regular bonus) game is executed.

Further, in a ordinary game, if three identical symbols of "Watermelon" or "Bell" line up on any activated pay line, a small prize is won, and fifteen medals are paid out, respectively. Similarly, in a ordinary game, if a combination of symbols "Bell"-"Bell"-"Red 7", a combination of symbols "Bell"-"Bell"-"Blue 7", or a combination of symbols "Bell"-"Bell"-"BAR" occurs, a small prize is also won, and ten medals are paid out, respectively.

Furthermore, in a ordinary game, if three identical "Plum" symbols occurs on any activated pay line, then a replay is won, and one can play another game without inserting any medal, although no medal is paid out. In addition, this combination of three "Plum" symbols is also a combination of a JAC game winning occurrence in a JAC game during an RB game. The JAC game refers to a game of trying to get a combination of "Plum"-"Plum"-"Plum" on the center pay line L1 in an RB game.

Moreover, in a ordinary game, if one symbol "Cherry" stops on one activated pay line for the first reel 3, a small prize is won and two medals are paid out, which is referred to as "two medals cherry". When three medals have been bet, if one symbol "Cherry" stops on two activated pay lines, four medals are paid out, which is referred to as "four medals cherry".

Figure 9:
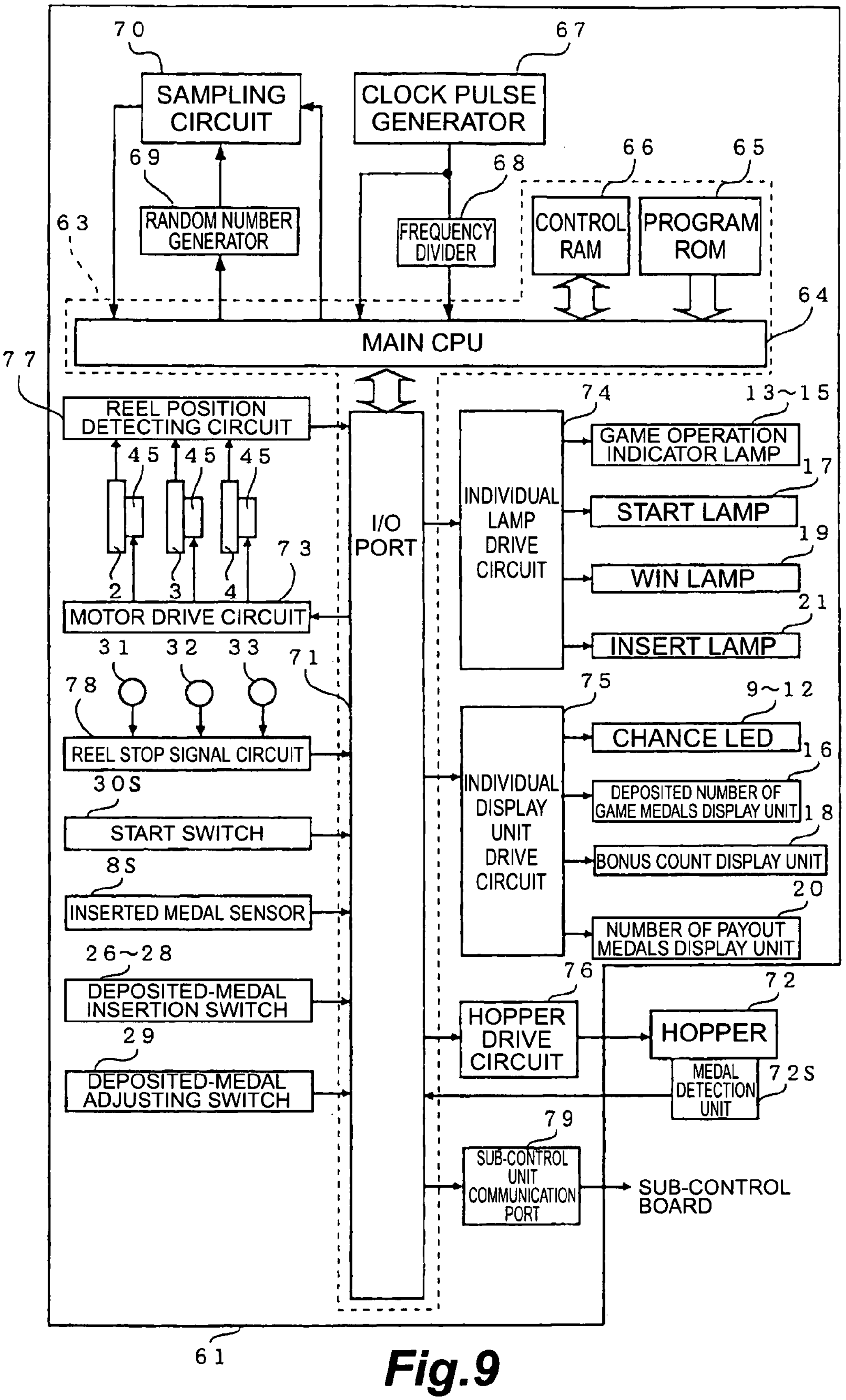
FIG. 9 is a block diagram showing a circuit configuration arranged on a main control board of the slot machine in accordance with this embodiment.
Figure 10:
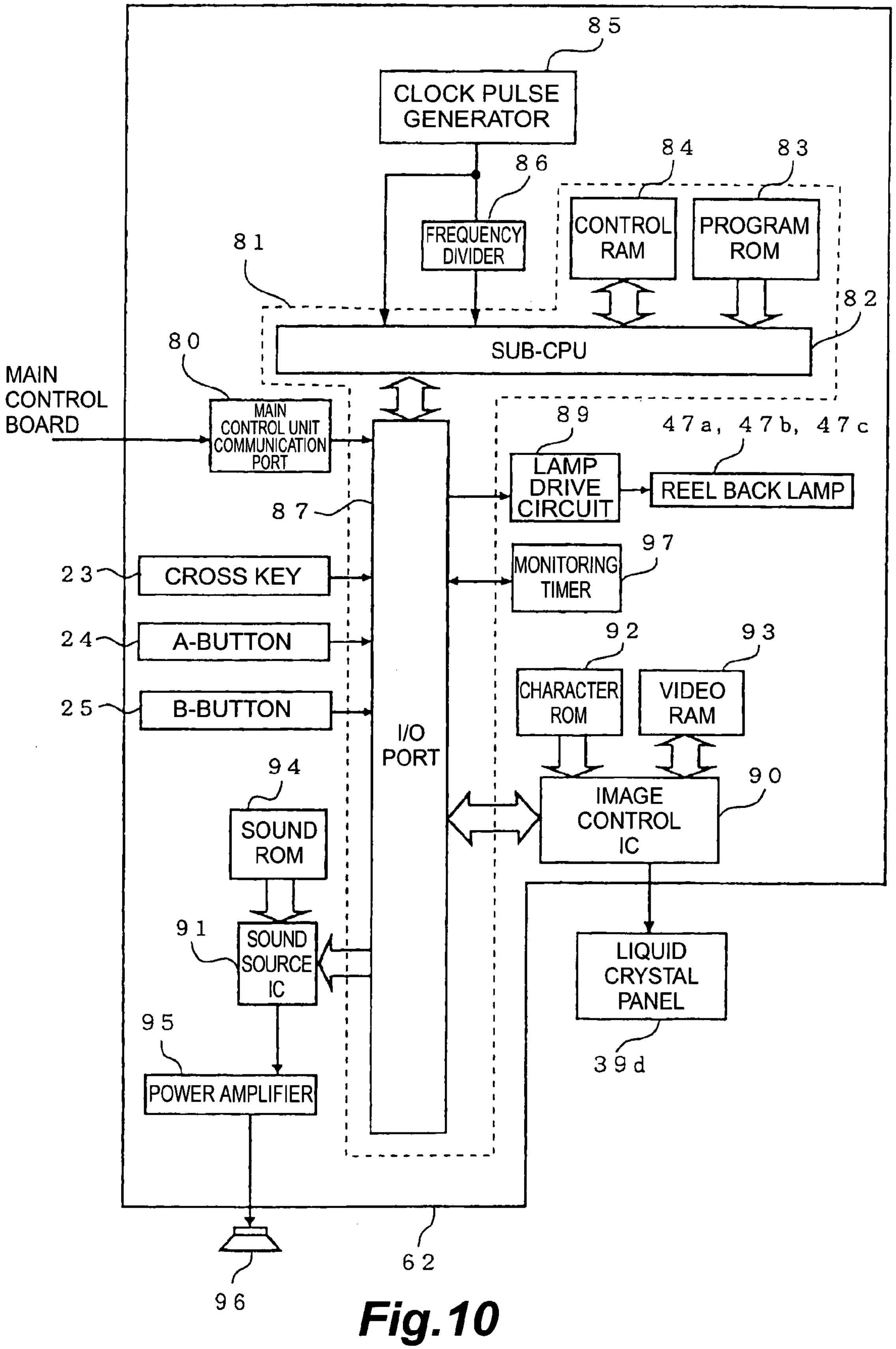
FIG. 10 is a block diagram showing a circuit configuration arranged on a sub-control board of the slot machine in accordance with this embodiment.

FIGS. 9 and 10 show circuit configurations arranged on a main control board 61 and a sub-control board 62 for controlling the game processing operation of the slot machine 1 described above.

The main control board 61 shown in FIG. 9 has a control unit comprising a microcomputer 63 as its major component, and additionally a circuit for sampling random numbers. The microcomputer 63 comprises a main CPU (central processing unit) 64 for performing control operations in accordance with a preset program, a program ROM (read only memory) 65 served as program storage means, and a backup-capable control RAM (random access memory) 66. The CPU 64 has connected thereto a clock pulse generator 67 and a frequency divider 68 for generating reference clock pulses, a random number generator 69 for generating a certain range of random numbers, and a random number sampling circuit 70 for specifying one of the generated random numbers. In addition, an I/O port 71 is also connected for communicating signals with peripheral devices (actuators) described below. The ROM 32 has a storage unit divided so as to store a winning probability table, a symbol table, a winning symbol combination table, and a sequence program.

Principal actuators whose operation is controlled by a control signal from the microcomputer 30 include the stepping motors 45 for rotationally driving the respective reels 2, 3, and 4, various lamps (game operation indicator lamps 13-15, start lamp 17, and WIN lamp 19), various display units (deposited number of game medals display unit 16, chance LEDs 9-12, bonus count display unit 18, number of payout medals display unit 20), and a hopper 72 for containing medals. These are driven by a motor drive circuit 73, an individual lamp drive circuit 74, an individual display unit drive circuit 75, and a hopper drive circuit 76, respectively. These drive circuits 73-76 are connected to the CPU 64 via the I/O port 71 of the microcomputer 63.

Major input signal generation means for generating input signals required for the microcomputer 63 to produce control signals include an inserted medal sensor 8S for detecting any medal inserted through the medal insertion slot 8, a start switch 30S for detecting any operation of the start lever 30, the above-described deposited-medal insertion switches 25-27, and the deposited-medal adjusting switch 29. In addition, there is a reel position detecting circuit 77 for detecting the rotational position of each reel 2, 3, 4 upon receipt of an output pulse signal from the photosensor 49. The photosensor 49 is included in the driving mechanism of each reel 2-4 and not shown in this figure.

The reel position detecting circuit 77 counts the number of driving pulses supplied to each stepping motor 45 after the reels 2-4 have started to rotate, and writes these count values to a predetermined area in the RAM 66. Accordingly, the RAM 66 stores the count value corresponding to the rotational position within a range of one rotational cycle for each reel 2-4. On the other hand, the photosensor 49 detects the shield plate 50 for each rotational cycle of the reel 2-4 to generate a reset pulse. This reset pulse is applied to the CPU 63 via the reel position detecting circuit 77 and causes the count value of driving pulses counted in the RAM 66 to be cleared to "0". This clear processing eliminates any deviation occurring between the moving display of each symbol and the rotation of each stepping motor 45 for one rotational cycle.

The input signal generation means described above also includes a reel stop signal circuit 78 for generating a signal for stopping a corresponding reel when any stop button 31, 32, 33 is pushed, a medal detection unit 72S for counting the number of medals paid out of the hopper 72, and a payout complete signal generation circuit not shown. The payout complete signal generation circuit generates a signal indicating the completion of medal payout when the count value of medals actually paid out inputted from the medal detection unit 72S reaches the payout amount data represented by the count signal inputted from the display unit drive circuit 75. Each circuit constituting these input signal generation means is also connected to the CPU 64 via the I/O port 71.

To the I/O port 71, a sub-control unit communication port 79 is connected. The microcomputer 63 delivers a signal to the sub-control board 62 via the sub-control unit communication port 79. The sub-control board 62 shown in FIG. 10 is provided with a main control unit communication port 80 for receiving this signal. Communication between the sub-control unit communication port 79 and the main control unit communication port 80 is performed only in one direction from the sub-control unit communication port 79 to the main control unit communication port 80. In this embodiment, the signal delivered from the sub-control unit communication port 79 to the main control unit communication port 80 is composed of a set of a command type representing its control type in 7-bit length and a parameter representing the content of the command in 8-bit or 24-bit length.

The sub-control board 62 has a control unit comprising a microcomputer 81 as its major component, and additionally a circuit for sampling random numbers. The microcomputer 81 also comprises, as with the microcomputer 63 in the main control board 61, a sub-CPU 82 for performing control operations in accordance with a preset program, a program ROM 83 serving as program storage means, and a backup-capable control RAM 84. The CPU 81 has also connected thereto a clock pulse generator 85 for generating reference clock pulses and a frequency divider 86. In addition, an I/O port 87 is connected for communicating signals with the main control unit communication port 80 and the actuators described below. The sub-CPU 82 calculates data required to display gaming machine data on the liquid crystal panel 39*d* on the basis of the command transmitted from the main control board 61 for each game, and updates data stored in the control RAM 84 to the data calculated for each game.

Actuators whose operation is controlled by a control signal from the microcomputer 81 include the reel back lamps 47*a*, 47*b*, and 47*c* embedded in the reels 2-4, respectively. The lighting of these reel back lamps 47*a*-47*c* is controlled by a driving signal from a lamp drive circuit 89 connected to the I/O port 87. In addition, input signal generation means for generating input signals required for the microcomputer 81 to produce control signals include the cross key 23, A-button 24, and B-button 25 described above. Furthermore, a game status monitoring timer 97 is connected to the I/O port 87. This timer 97 is set at the time of starting a game by the sub-CPU 82, and measures an elapsed time since the start of the game.

An image control IC (integrated circuit) 90 and a sound source IC 91 are also connected to the I/O 87. The image control IC 90 has connected thereto a character ROM 92 for storing character data and a video RAM 93 serving as a memory for color display representation. The image control IC 90 displays an image on the liquid crystal panel 39*d* of the reel display window unit 39 under the control of the microcomputer 81. The microcomputer 81 fetches such information as the current game status and the type of winning flag from the main control board 61 via the main control unit communication port 80, and selects an image effect pattern to be displayed on the basis of the fetched game status and winning flag. It then controls the image control IC 90 for causing the liquid crystal panel 39*d* to display the selected pattern. The liquid crystal panel 39*d* may be caused to display information desired by a player through the operation of the cross key 23, A-button 24 and B-button 25.

The sound source IC 91 has connected thereto a sound ROM 94 for storing sound data. Under the control of the microcomputer 81, the sound source IC 91 causes a speaker 96 via a power amplifier 95 to emit a sound. In accordance with the instructions inputted from the main control board 61 via the main control unit communication port 80, the microcomputer 81 controls the sound source IC 91 and power amplifier 95 for causing the speaker 96 to produce such sound effects as a medal insertion sound, a start lever operation sound, a stop button operation sound, and a game sound during a bonus game.

In the slot machine 1 in accordance with this embodiment having the configuration described above, when a player operates the start lever 30, this operation leads to a turn on of the start switch 30S. This ON signal is detected by the main CPU 64 via the I/O port 71. The main CPU 64 then controls the motor drive circuit 73 for driving the stepping motors 45, causing each reel 2-4 to rotate. At the same time as this rotating, the main CPU 64 performs probability lottery processing. By making reference to a lottery probability table deposited in the program ROM 65, a lottery of the internal winning mode is drawn. The type of the drawn internal winning mode and the current game status are transmitted to the sub-control board 62 via the sub-control unit communication port 79.

As each reel 2-4 rotates, a moving sequence of symbols is variably displayed in each window 5-7. The player tries to adjust the timing of operating each stop button 31-33 while observing this variable display, and performs a push operation of each stop button 31-33 at an appropriate timing. The operation of each stop button 31-33 is detected by the main CPU 64 via the reel stop signal circuit 78. At the time of this detection, supply of driving pulses to each stepping motor 45 is stopped by the control of the main CPU 64. When the supply of driving pulses to each stepping motor 45 is stopped, each reel 2-4 stops rotating, and symbols corresponding to the operation timing of each stop button 31-33 are stop-displayed in each window 5-7. At this time, if any predetermined combination of symbols shown in the payout table is stop-displayed in the windows 5-7, a winning occurs. When a winning occurs, the main CPU 64 controls the hopper drive circuit 76 for driving the hopper 72, and a predetermined number of medals are paid out of the payout opening 35 into the receiving tray 34.

The type of internal winning mode and the game status transmitted from the sub-control unit communication port 79 to the sub-control board 62 is received by the sub-control board 62 via the main control unit communication port 80 of the sub-control board 62. During the slot machine game described above, effects of the slot machine game are performed under the control of the sub-CPU 82 which has detected the type of internal winning mode and the game status, such as blinking reel back lamps 47*a*, 47*b*, and 47*c* embedded in the reels 2-4 or displaying character designs on the liquid crystal display 39*d* provided below the display windows 5-7 of the reel display window unit 39. Furthermore, in this embodiment, effects are displayed in accordance with the type of internal winning mode and the game status also on the liquid crystal display 39*d* provided in reel display window unit 39 in front of the reels 2-4.

According to the slot machine 1 in accordance with this embodiment as described above, the liquid crystal panel 39*d* disposed in front of the reels 2-4 for variably displaying symbols serves as a new machine component for performing game effects. Therefore, new effects for the slot machine game can be performed on the liquid crystal panel 39*d*, which facilitates maintaining the novelty of effects for the slot machine game.

Furthermore, in the slot machine 1 in accordance with this embodiment, the reel glass base 39*b* and bezel metal frame 39*c* are interposed between the transparent acryl plate 39*a* on the machine surface and the liquid crystal panel 39*d*. As a result, the display unit of the liquid crystal panel 39*d* for displaying game effects is disposed in a position recessed from the transparent acryl plate 39*a*. Therefore, the display unit of the liquid crystal panel 39*d* is provided with depth feeling. In addition, blind spots in viewing this display unit are eliminated, and thus the liquid crystal panel 39*d* can be clearly viewed up to the edge of its display unit.

As described above, according to this invention, the liquid crystal display panel disposed in front of the variable display means for variably displaying designs serves as a new machine component for performing game effects. Further, a base frame and a panel frame are interposed between the transparent plate on the machine surface and the liquid crystal display panel. As a result, the display unit of the liquid crystal display panel for displaying game effects is disposed in a position recessed from the transparent plate. Accordingly, new game effects can be performed on the liquid crystal display panel, which facilitates maintaining the novelty of game effects. Moreover, since the liquid crystal display panel is located in a recessed position, its display unit is provided with depth feeling. In addition, blind spots in viewing the display unit are eliminated, and thus the display unit can be clearly viewed up to its edge.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A gaming machine comprising:

a variable display device for variably displaying symbols;

a front display device disposed in front of the variable display device, wherein the front display device includes a liquid crystal display panel through which the variable display device is seen;

a light guiding plate for guiding light emitted from a first light source to the liquid crystal display panel, which is disposed between the variable display device and the liquid crystal display panel and has at least one first opening allowing the symbols variably displayed in the variable display device to be observed;

a rear holder which is disposed between the variable display device and the light guiding plate, and reflects the light emitted on the light guiding plate to the side of the liquid crystal display panel, the rear holder has at least one second opening allowing the symbols variably displayed in the variable display device to be observed, the rear holder comprises a recessed marginal portion to which an antistatic sheet covering the second opening is adhered with a double-sided adhesive tape; and a second light source which is provided between the rear holder and the variable display device.

2. The gaming machine according to claim 1, wherein the second light source is provided close proximity to the recessed marginal portion of the rear holder above or below the second opening.

3. The gaming machine according to claim 1, wherein the variable display device is one or more rotatable reels each having a reel band thereon, on which the symbols are affixed.

4. The gaming machine according to claim 1, wherein said gaming machine is a slot machine.

* * * * *